US012759025B2

(12) United States Patent
Hu et al.

(10) Patent No.: US 12,759,025 B2
(45) Date of Patent: Oct. 13, 2026

(54) OPTICAL ELEMENT DRIVING MECHANISM

(71) Applicant: Actutek Corporation, Taoyuan City (TW)

(72) Inventors: Hsiao-Hsin Hu, Taoyuan City (TW); Shu-Shan Chen, Taoyuan City (TW); Chao-Chang Hu, Taoyuan City (TW); Pai-Jui Cheng, Taoyuan City (TW); Chieh-An Chang, Taoyuan City (TW)

(73) Assignee: Actutek Corporation, Taoyuan City (TW)

(*) Notice: Subject to any disclaimer, the term of this patent is extended or adjusted under 35 U.S.C. 154(b) by 508 days.

(21) Appl. No.: 18/088,086

(22) Filed: Dec. 23, 2022

(65) Prior Publication Data

US 2023/0204829 A1 Jun. 29, 2023

Related U.S. Application Data

(60) Provisional application No. 63/266,034, filed on Dec. 27, 2021.

(51) Int. Cl.

| | |
|---|---|
| ***G02B 5/00*** | (2006.01) |
| ***B08B 7/02*** | (2006.01) |
| ***G02B 26/08*** | (2006.01) |
| ***G02B 27/00*** | (2006.01) |
| ***H04N 23/55*** | (2023.01) |
| *G02B 7/08* | (2021.01) |
| *G03B 5/00* | (2021.01) |
| *H04N 23/51* | (2023.01) |
| *H04N 23/68* | (2023.01) |

(52) U.S. Cl.

CPC ................ *B08B 7/02* (2013.01); *G02B 26/08* (2013.01); *G02B 27/0006* (2013.01); *H04N 23/55* (2023.01); *G02B 7/08* (2013.01); *G03B 5/00* (2013.01); *G03B 2205/0015* (2013.01); *H04N 23/51* (2023.01); *H04N 23/687* (2023.01)

(58) Field of Classification Search

CPC .............. G03B 5/00; G03B 2205/0015; G03B 2205/0069; G03B 3/10; G03B 5/06; G03B 30/00; B08B 7/028; B08B 7/02; B60S 1/56; B60S 1/60; G02B 5/005; G02B 7/08; G02B 26/08; G02B 27/0006; G02B 27/642; G02B 27/646; G02B 7/04; H02K 41/0354; H04N 23/51; H04N 23/55; H04N 23/6812; H04N 23/687; H04N 23/00; H04N 23/54; H05B 3/84; B06B 1/06; B60R 11/00; B60R 11/04; B60R 2011/0026; B60R 2011/004

See application file for complete search history.

(56) References Cited

U.S. PATENT DOCUMENTS

2020/0249415 A1* 8/2020 Wang ..................... G03B 30/00
2021/0149143 A1* 5/2021 Hu ........................... G02B 7/08

* cited by examiner

*Primary Examiner* — Marin Pichler
(74) *Attorney, Agent, or Firm* — MUNCY, GEISSLER, OLDS & LOWE, P.C.

(57) ABSTRACT

An optical element driving mechanism is provided. The optical element driving mechanism includes a fixed assembly, a movable part, and a driving assembly. The movable part is movable relative to the fixed assembly. The driving assembly is configured to drive the movable part to move relative to the fixed assembly. The optical element driving mechanism further includes a holding assembly, and the driving assembly drives the movable part to move relative to the fixed assembly by the holding assembly.

20 Claims, 12 Drawing Sheets

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE INVENTION

According to some embodiments of the disclosure, the present disclosure provides an optical element driving mechanism is provided and includes a fixed assembly, a movable part, and a driving assembly. The movable part is movable relative to the fixed assembly. The driving assembly is configured to drive the movable part to move relative to the fixed assembly. The optical element driving mechanism further includes a holding assembly, and the driving assembly drives the movable part to move relative to the fixed assembly by the holding assembly.

According to some embodiments, the holding assembly has a plate-shaped structure. The holding assembly includes a bottom plate, a first side plate and a second side plate. The first side plate extends from the bottom plate toward the second side plate. The second side plate extends from the bottom plate toward the first side plate. The bottom plate, the first side plate and the second side plate are integrally formed as one piece.

According to some embodiments, the driving assembly includes a driving member which extends along the first axis. The driving member has a long strip-shaped structure. When viewed along the first axis, the driving member has a circular structure. The bottom plate, the first side plate and the second side plate are respectively in contact with the driving member.

According to some embodiments, a holding opening is formed between the first side plate and the second side plate. The holding opening faces the base wall of the base of the fixed assembly. When viewed along the first axis, an included angle between the first side plate and the bottom plate is between 30 degrees and 70 degrees. When viewed along the first axis, an included angle between the first side plate and the second side plate is greater than 40 degrees and less than or equal to 120 degrees.

According to some embodiments, when viewed along the first axis, the first side plate is in contact with the driving member at the first contact point. The shortest distance between the first contact point and the first end portion of the first side plate is less than or equal to 0.4 mm. When viewed along the first axis, the second side plate is in contact with the driving member at the second contact point. The shortest distance between the second contact point and the second end portion of the second side plate is less than or equal to 0.4 mm.

According to some embodiments, when viewed along the first axis, the first side plate is symmetrical to the second side plate. When viewed along the first axis, the first side plate and/or the second side plate have an arc-shaped structure.

According to some embodiments, the movable part has a front side portion and a rear side portion. The rear side portion is connected to the front side portion. The rear side portion and the front side portion are integrally formed as one piece. The bottom plate is fixedly connected to the rear side portion.

According to some embodiments, a plurality of first through holes is formed on the rear side portion. Each first through hole extends along the first axis. The first through holes are arranged along a second axis. The second axis is perpendicular to the first axis.

According to some embodiments, the optical element driving mechanism further includes an adhesive element configured to be accommodated in the first through holes and contact the bottom plate so that the rear side portion is adhered to the bottom plate.

According to some embodiments, the movable part has a metal material. The holding assembly has a metal material. The movable part has a front side portion and a rear side portion. The rear side portion is connected to the front side portion. The rear side portion and the front side portion are integrally formed as one piece. The bottom plate is fixedly connected to the rear side portion.

According to some embodiments, the rear side portion has a hole. When viewed along a third axis, the hole has a rectangular structure. When viewed along the third axis, the hole is formed by four inner edges of the rectangular structure. The four inner edges are affixed to the bottom plate by laser welding. The third axis is perpendicular to the first axis.

According to some embodiments, the movable part has a front side portion and a rear side portion. The rear side portion is connected to the front side portion. The rear side portion and the front side portion are integrally formed as one piece. The bottom plate and the rear side portion are integrally formed as one piece.

According to some embodiments, a holding opening is formed between the first side plate and the second side plate. The holding opening faces the side wall of the base of the fixed assembly. When viewed along the first axis, an included angle between the first side plate and the bottom plate is between 30 degrees and 70 degrees. When viewed along the first axis, an included angle between the second side plate and the bottom plate is between 30 degrees and 70 degrees. When viewed along the first axis, an included angle between the first side plate and the second side plate is greater than 40 degrees and less than or equal to 120 degrees.

According to some embodiments, when viewed along the first axis, the first side plate is in contact with the driving member at the first contact point. The shortest distance between the first contact point and the first end portion of the first side plate is less than or equal to 0.6 mm. When viewed along the first axis, the second side plate is in contact with the driving member at the second contact point. The shortest distance between the second contact point and the second end portion of the second side plate is less than or equal to 1 mm.

According to some embodiments, when viewed along the first axis, the length of the first side plate is different from the length of the second side plate. When viewed along the first axis, the length of the first side plate is less than the length of the second side plate.

According to some embodiments, the movable part has a front side portion and a rear side portion. The rear side portion is connected to the front side portion. The rear side portion and the front side portion are integrally formed as one piece. The second side plate and the rear side portion are integrally formed as one piece.

According to some embodiments, the optical element driving mechanism further includes a stopping assembly configured to limit the movable part to move relative to the fixed assembly within a range of motion. The fixed assembly further includes an outer frame and a base. The outer frame is fixedly connected to the base. The base has a first opening. When the movable part is located in a first extreme position of the range of motion, the movable part does not overlap the first opening. When the driving assembly drives the movable part to move from the first extreme position along a first axis to a second extreme position of the range of motion, the movable part overlaps the first opening.

According to some embodiments, the stopping assembly includes a first stopping portion and a second stopping portion, respectively disposed on a first side wall and a second side wall of the base. The stopping assembly further includes a first stopping structure and a second stopping structure, disposed on the movable part. The first stopping portion and the second stopping portion are configured to respectively block the first stopping structure and the second stopping structure.

According to some embodiments, the first gap between the first stopping portion and the first stopping structure along the second axis is less than or equal to 0.1 mm. The second gap between the second stopping portion and the second stopping structure along the second axis is less than or equal to 0.1 mm. The second axis is perpendicular to the first axis.

According to some embodiments, the stopping assembly further includes a third stopping portion and a fourth stopping portion, which are disposed on the base wall of the base. When the movable part is located in the first extreme position, the third stopping portion is configured to block the holding assembly. When the movable part is located in the second extreme position, the fourth stopping portion is configured to block the holding assembly.

The present disclosure provides an optical element driving mechanism, including a fixed assembly, a movable part, a driving assembly and a holding assembly. The driving assembly drives the movable part to move relative to the fixed assembly between the first extreme position and the second extreme position by the holding assembly, so that the movable part selectively shields the first opening of the fixed assembly. Therefore, the optical element driving mechanism can be used as a shutter mechanism.

In addition, in some embodiments, in some embodiments, the driving assembly has a driving member with a long strip-shaped structure, and the holding assembly includes a bottom plate, a first side plate and a second side plate. The first side plate is bent from the bottom plate and extends toward the second side plate, the second side plate is bent from the bottom plate and extends toward the first side plate, and the bottom plate, the first side plate and the second side plate cooperatively hold the driving member.

Based on such a structural design, when the optical element driving mechanism is impacted, it can be ensured that the driving member is not separated from the holding assembly when impacted, thereby increasing the overall reliability. In addition, the bottom plate and the movable part can be integrally formed as one piece, so that the overall height of the optical element driving mechanism can be reduced, so as to achieve the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The present invention can be more fully understood by reading the subsequent detailed description

DETAILED DESCRIPTION OF THE INVENTION

Figure 1:
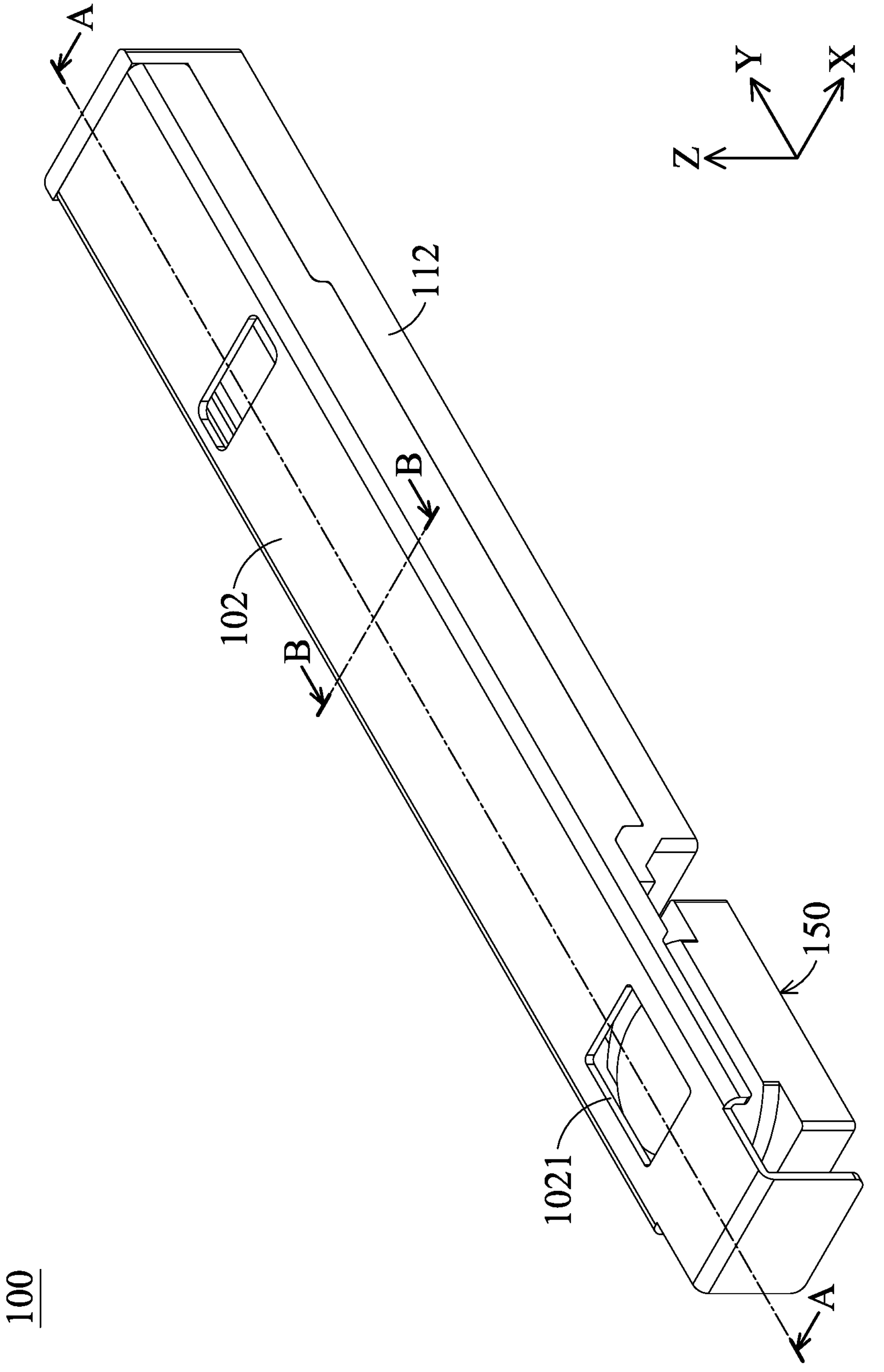
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
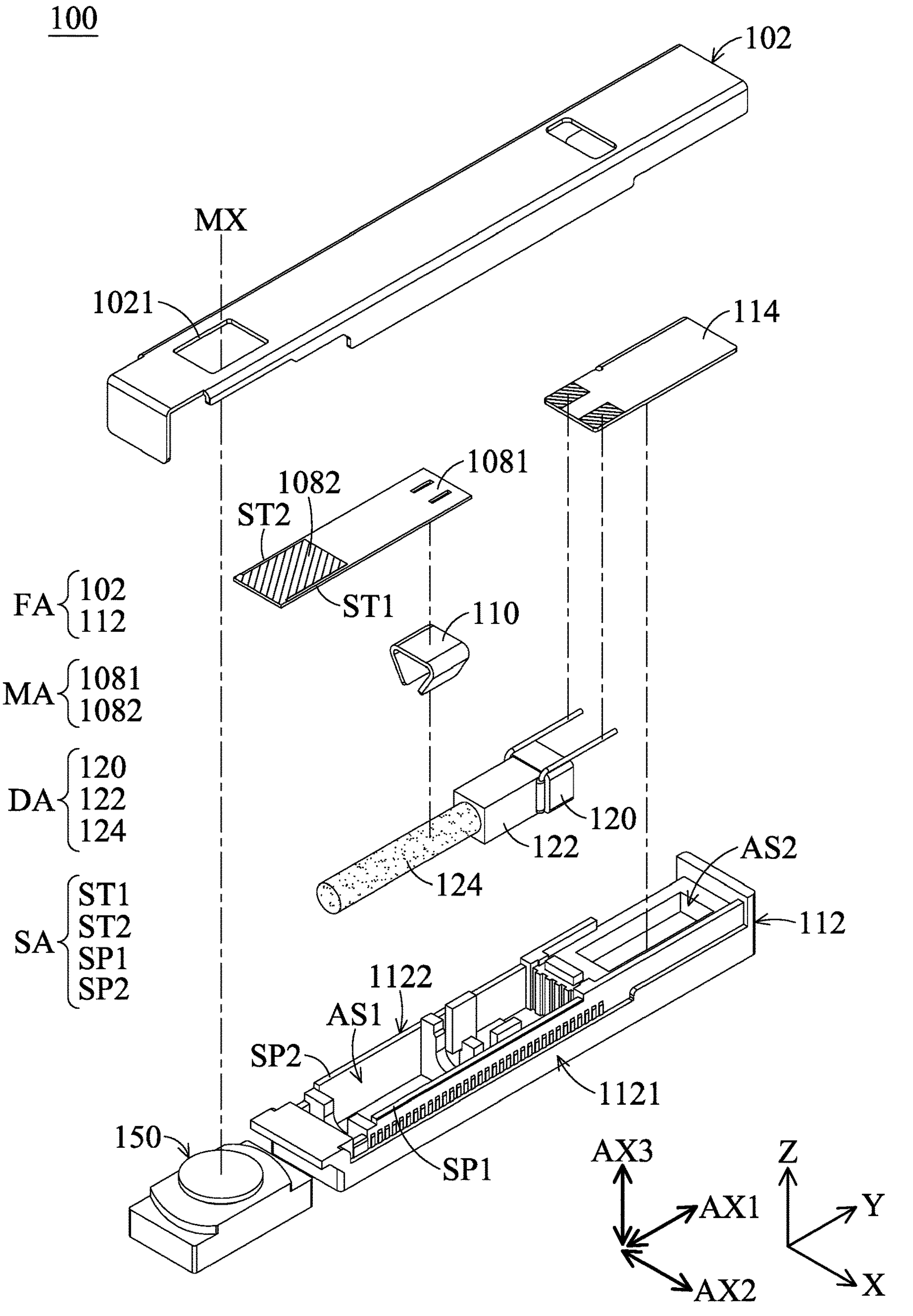
FIG. 2 shows an exploded diagram of the optical element driving mechanism 100 according to the embodiment of the present disclosure.

Please refer to FIG. 1 to FIG. 2. FIG. 1 shows a schematic diagram of an optical element driving mechanism 100 according to an embodiment of the present disclosure, and FIG. 2 shows an exploded diagram of the optical element driving mechanism 100 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving assembly DA. The movable assembly MA is movably connected to the fixed assembly FA. The driving assembly DA is configured to drive the movable assembly MA to move relative to the fixed assembly FA.

In this embodiment, as shown in FIG. 2, the fixed assembly FA includes an outer frame 102, and a base 112. The movable assembly MA may include a movable part 1081 and a shading portion 1082. In this embodiment, the movable part 1081 and the shading portion 1082 can serve as an optical element, for example, can be used as a light-shielding film or a shutter, but it is not limited thereto. In other embodiments, the movable part 1081 and the shading portion 1082 can also be used as a filter or aperture, and so on.

In this embodiment, the movable part 1081 may have a metal material, but it is not limited thereto. In other embodiments, for example, the movable part 1081 can be made of plastic material. The shading portion 1082 can be, for example, a dark plastic film fixed on the movable part 1081, but it is not limited thereto.

The outer frame 102 is fixedly connected to the base 112, the outer frame 102 can be combined with the base 112 to cooperatively accommodate the movable assembly MA and the driving assembly DA, and the movable part 1081 is movable relative to the fixed assembly FA.

As shown in FIG. 2, the aforementioned outer frame 102 has a first opening 1021, and the base 112 accommodate an optical module 150 (for example, a photosensitive module). The first opening 1021 is configured to allow an external light traveling along a main axis MX to pass and to be received by the aforementioned optical module 150 so as to generate a digital image signal.

In this embodiment, the optical element driving mechanism 100 further includes a holding assembly 110, and the driving assembly DA uses the holding assembly 110 to drive the movable part 1081 to move relative to the fixed assembly FA. Specifically, the holding assembly 110 is fixedly connected to the movable part 1081. As shown in FIG. 2, when viewed along the first axis AX1, the movable part 1081 (the movable assembly MA) does not overlap with the holding assembly 110. When viewed along the second axis AX2, the movable part 1081 (the movable assembly MA) does not overlap with the holding assembly 110. When viewed along the third axis AX3, the movable part 1081 (the movable assembly MA) partially overlaps with the holding assembly 110. The first axis AX1, the second axis AX2, and the third axis AX3 are perpendicular to each other.

Furthermore, the driving assembly DA is disposed in a first accommodating space AS1 of the base 112, and the driving assembly DA has a counterweight 120, a piezoelectric element 122 and a driving member 124. The piezoelectric element 122 is fixed on the counterweight 120, and the piezoelectric element 122 can be, for example, piezoelectric ceramics or piezoelectric resin.

The driving member 124 has a long strip-shaped structure (such as a cylinder) extending along a first axis AX1, and the driving member 124 is fixedly connected to the piezoelectric element 122. The driving member 124 can be made of carbon material, but it is not limited thereto. The holding assembly 110 is disposed on the driving member 124 and can move along the driving member 124.

The optical element driving mechanism 100 further includes a circuit assembly 114 fixedly disposed in a second accommodating space AS2 of the base 112. The circuit assembly 114 is, for example, a flexible circuit board which is electrically connected to the piezoelectric element 122. The circuit assembly 114 can control the piezoelectric element 122 to drive the driving member 124 to vibrate, and then drive the holding assembly 110 and the movable part 1081 to move forward and backward along the first axis AX1.

Figure 3:
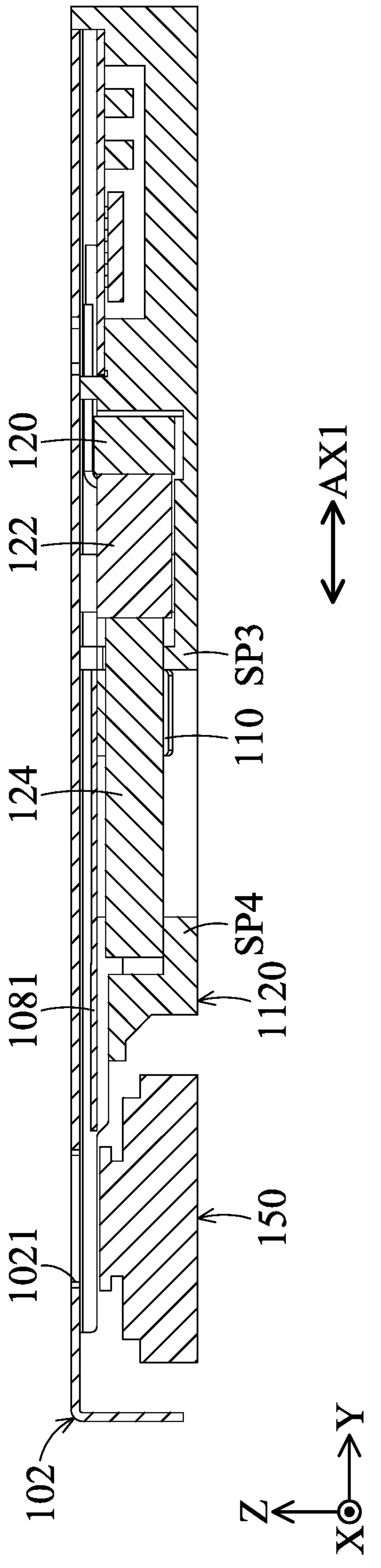
FIG. 3 is a cross-sectional view of the optical element driving mechanism 100 along line A-A in FIG. 1 according to an embodiment of the present disclosure.
Figure 4:
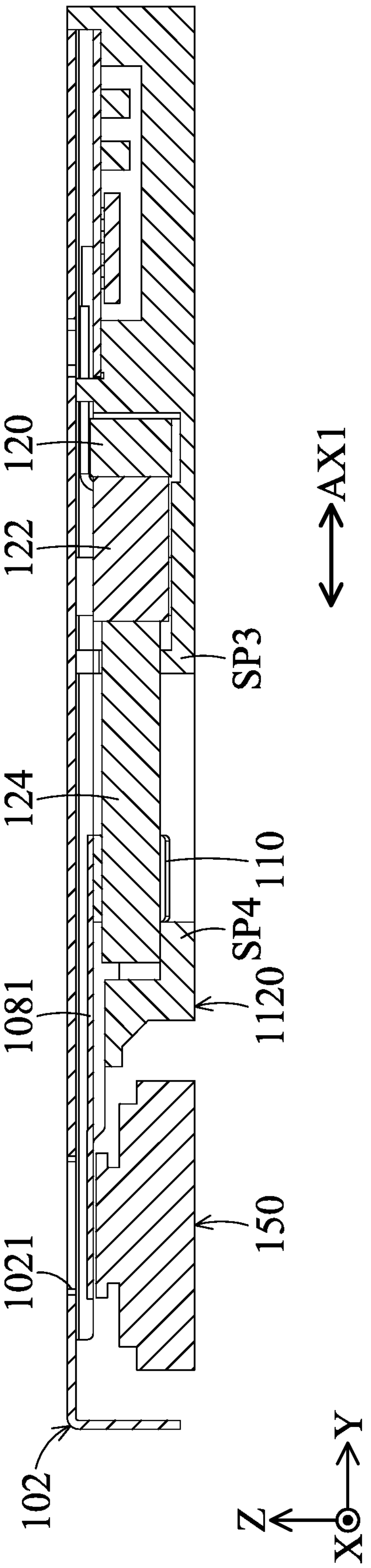
FIG. 4 is a cross-sectional view of the holding assembly 110 located in a second extreme position according to an embodiment of the present disclosure.

Next, please refer to FIG. 2 to FIG. 4. FIG. 3 is a cross-sectional view of the optical element driving mechanism 100 along line A-A in FIG. 1 according to an embodiment of the present disclosure, and in FIG. 3, the holding assembly 110 is located in a first extreme position. FIG. 4 is a cross-sectional view of the holding assembly 110 located in a second extreme position according to an embodiment of the present disclosure.

As shown in FIG. 3 and FIG. 4, the driving assembly DA can drive the holding assembly 110 and the movable part 1081 to move between the first extreme position and the second extreme position. Furthermore, the optical element driving mechanism 100 further includes a stopping assembly SA configured to limit the movable part 1081 to move relative to the fixed assembly FA within a range of motion.

As shown in FIG. 3, when the movable part 1081 is located in the first extreme position of the range of motion, the movable part 1081 does not overlap the first opening 1021. As shown in FIG. 4, when the driving assembly DA drives the movable part 1081 to move from the first extreme position along the first axis AX1 to the second extreme position of the range of motion, the movable part 1081 overlaps the first opening 1021.

As shown in FIG. 2, the stopping assembly SA may include a first stopping portion SP1 and a second stopping portion SP2, which are respectively disposed on a first side wall 1121 and a second side wall 1122 of the base 112. Furthermore, correspondingly, the stopping assembly SA may further include a first stopping structure ST1 and a second stopping structure ST2, which are disposed on the movable part 1081.

When the movable part 1081 moves along the first axis AX1, the first stopping portion SP1 and the second stopping portion SP2 are configured to respectively block the first stopping structure ST1 and the second stopping structure ST2, thereby limiting the movable part 1081 to move along a second axis AX2. The second axis AX2 is perpendicular to the first axis AX1.

Moreover, as shown in FIG. 3 and FIG. 4, the stopping assembly SA further includes a third stopping portion SP3 and a fourth stopping portion SP4, which are disposed on a base wall 1120 of the base 112. When the movable part 1081 is located in the first extreme position, the third stopping portion SP3 is configured to block the holding assembly 110. When the movable part 1081 is located in the second extreme position, the fourth stopping portion SP4 is configured to block the holding assembly 110.

Figure 5:
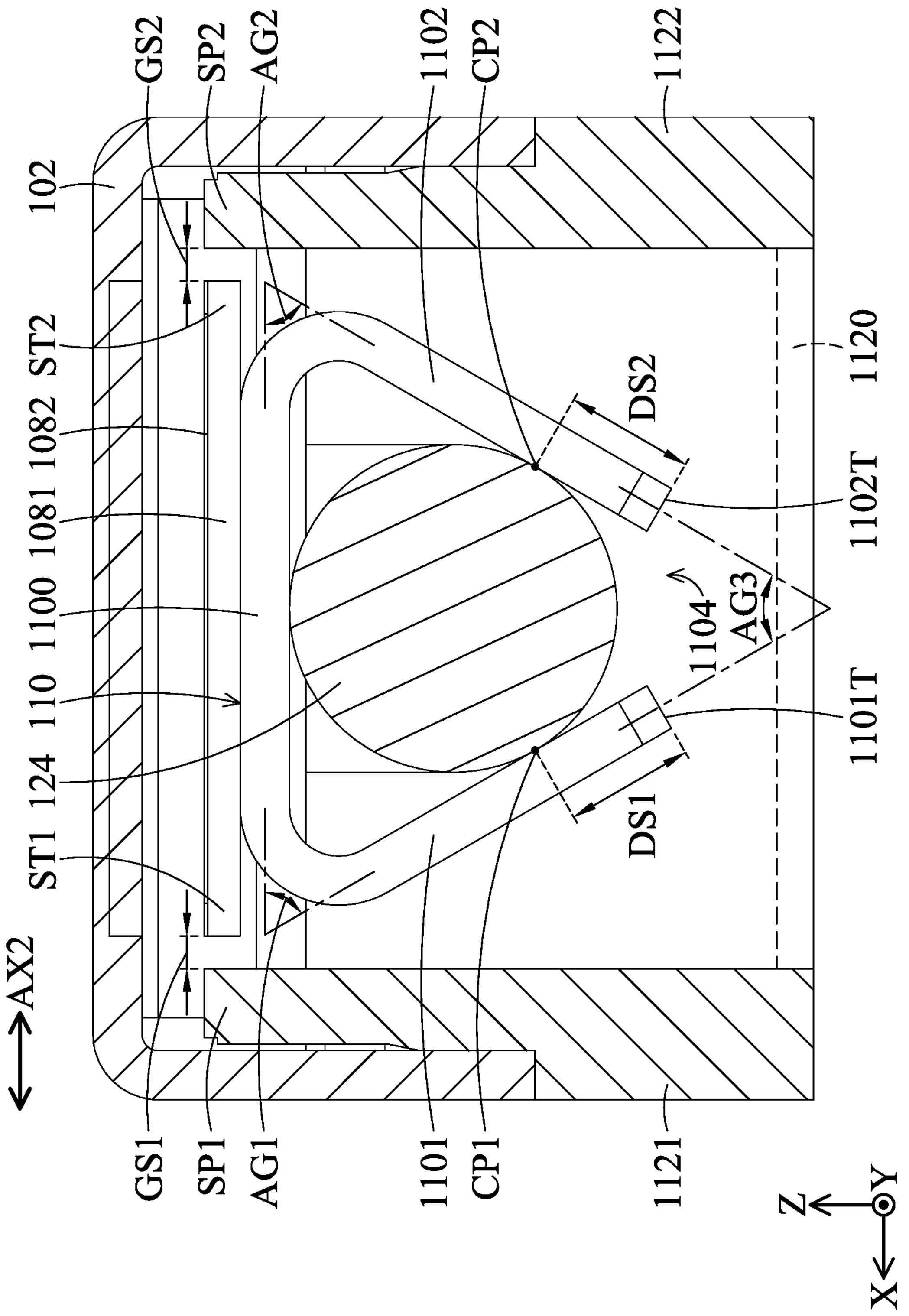
FIG. 5 is a cross-sectional view of the optical element driving mechanism 100 along the line B-B in FIG. 1 according to an embodiment of the present disclosure.

Next, please refer to FIG. 5, which is a cross-sectional view of the optical element driving mechanism 100 along the line B-B in FIG. 1 according to an embodiment of the present disclosure. In this embodiment, the holding assembly 110 has a plate-shaped structure, and the holding assembly 110 is, for example, a flexible metal sheet. The holding assembly 110 includes a bottom plate 1100, a first side plate 1101 and a second side plate 1102. The first side plate 1101 and the second side plate 1102 are formed by bending the bottom plate 1100. As shown in FIG. 5, The first side plate 1101 and the second side plate 1102 are formed by bending opposite ends of the bottom plate 1100 toward each other. The bottom plate 1100, the first side plate 1101 and the second side plate 1102 are formed from a single continuous sheet material.

Specifically, the first side plate 1101 extends from the bottom plate 1100 toward the second side plate 1102, and the second side plate 1102 extends from the bottom plate 1100 toward the first side plate 1101, and the bottom plate 1100, the first side plate 1101 and the second side plate 1102 are integrally formed as one piece. The first side plate 1101 and the second side plate 1102 are linear structures.

As shown in FIG. 5, when viewed along the first axis AX1 (the Y-axis), the driving member 124 has a circular structure, and the bottom plate 1100, the first side plate 1101 and the second side plate 1102 are respectively in contact with the driving member 124.

Moreover, a holding opening 1104 is formed between the first side plate 1101 and the second side plate 1102, and the holding opening 1104 is facing the base wall 1120 of the base 112 of the fixed assembly FA.

When viewed along the first axis AX1, the included angle AG1 between the first side plate 1101 and the bottom plate 1100 is between 30 degrees to 70 degrees. Similarly, the included angle AG2 between the second side plate 1102 and the bottom plate 1100 may also be 30 degrees to 70 degrees. When viewed along the first axis AX1, the included angle AG3 between the first side plate 1101 and the second side plate 1102 is greater than 40 degrees and less than or equal to 120 degrees.

When viewed along the first axis AX1, the first side plate 1101 is in contact with the driving member 124 at a first contact point CP1, and the shortest distance DS1 between the first contact point CP1 and a first end portion 1101T of the first side plate 1101 is less than or equal to 0.4 mm.

When viewed along the first axis AX1, the second side plate 1102 is in contact with the driving member 124 at a second contact point CP2, and the shortest distance DS2 between the second contact point CP2 and a second end portion 1102T of the second side plate 1102 is less than or equal to 0.4 mm.

In this embodiment, when viewed along the first axis AX1, the first side plate 1101 is symmetrical to the second side plate 1102, but it is not limited thereto. In other embodiments, the first side plate 1101 and the second side plate 1102 may have different lengths.

In addition, as shown in FIG. 5, a first gap GS1 between the first stopping portion SP1 and the first stopping structure ST1 along the second axis AX2 is less than or equal to 0.1 mm. For example, the first gap GS1 can be 0.08 mm. Similarly, a second gap GS2 between the second stopping portion SP2 and the second stopping structure ST2 along the second axis AX2 is less than or equal to 0.1 mm. For example, the second gap GS2 can be 0.08 mm.

Figure 5A:
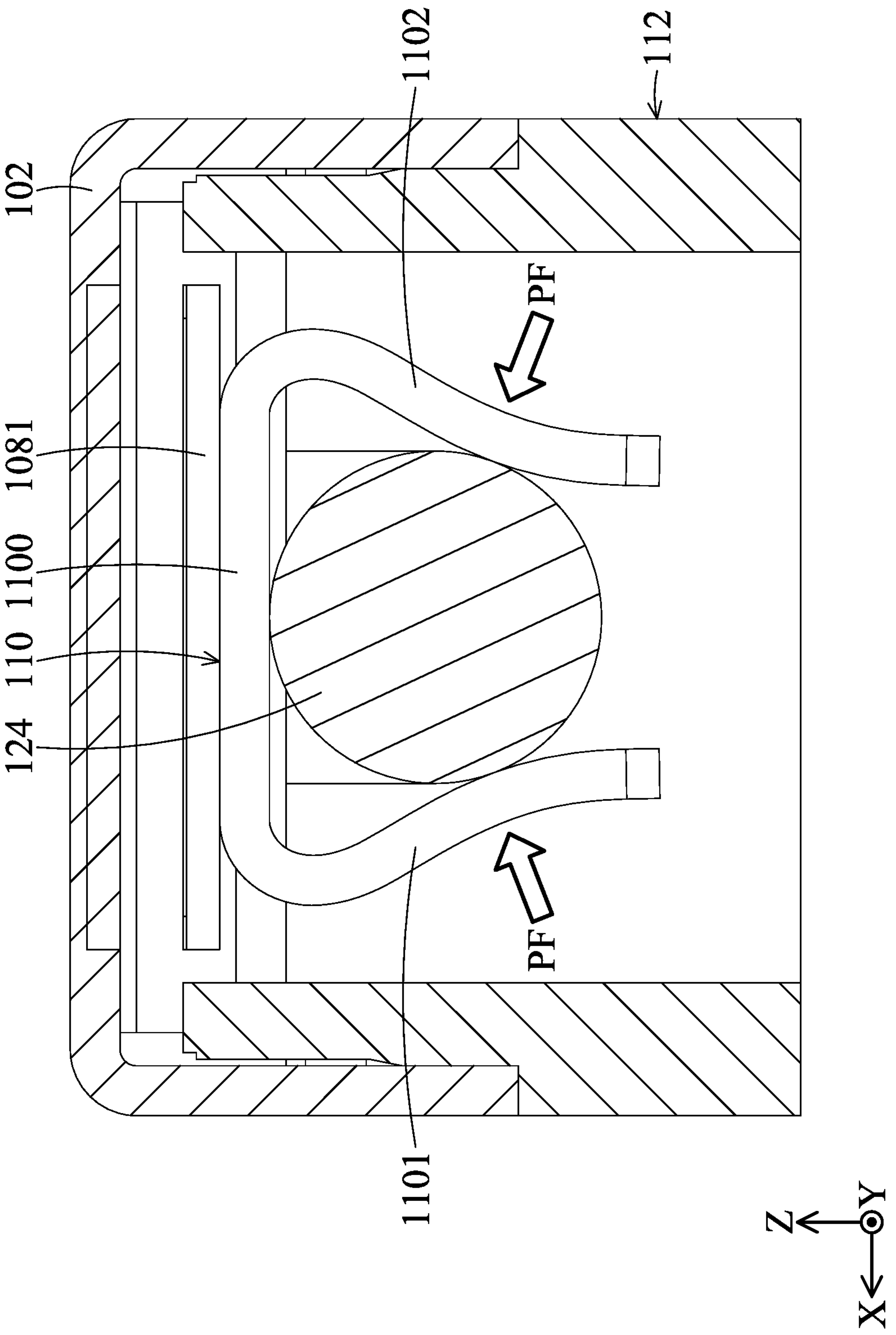
FIG. 5A is a cross-sectional view of the optical element driving mechanism 100 along the line B-B in FIG. 1 according to another embodiment of the present disclosure.

Please refer to FIG. 5A, which is a cross-sectional view of the optical element driving mechanism 100 along the line B-B in FIG. 1 according to another embodiment of the present disclosure. In this embodiment, because the first side plate 1101 and the second side plate 1102 have a larger and inward pre-pressure PF, when the holding assembly 110 holds the driving member 124 and when viewed along the first axis AX1, the first side plate 1101 and/or second side plate 1102 have an arc-shaped structure.

Figure 6:
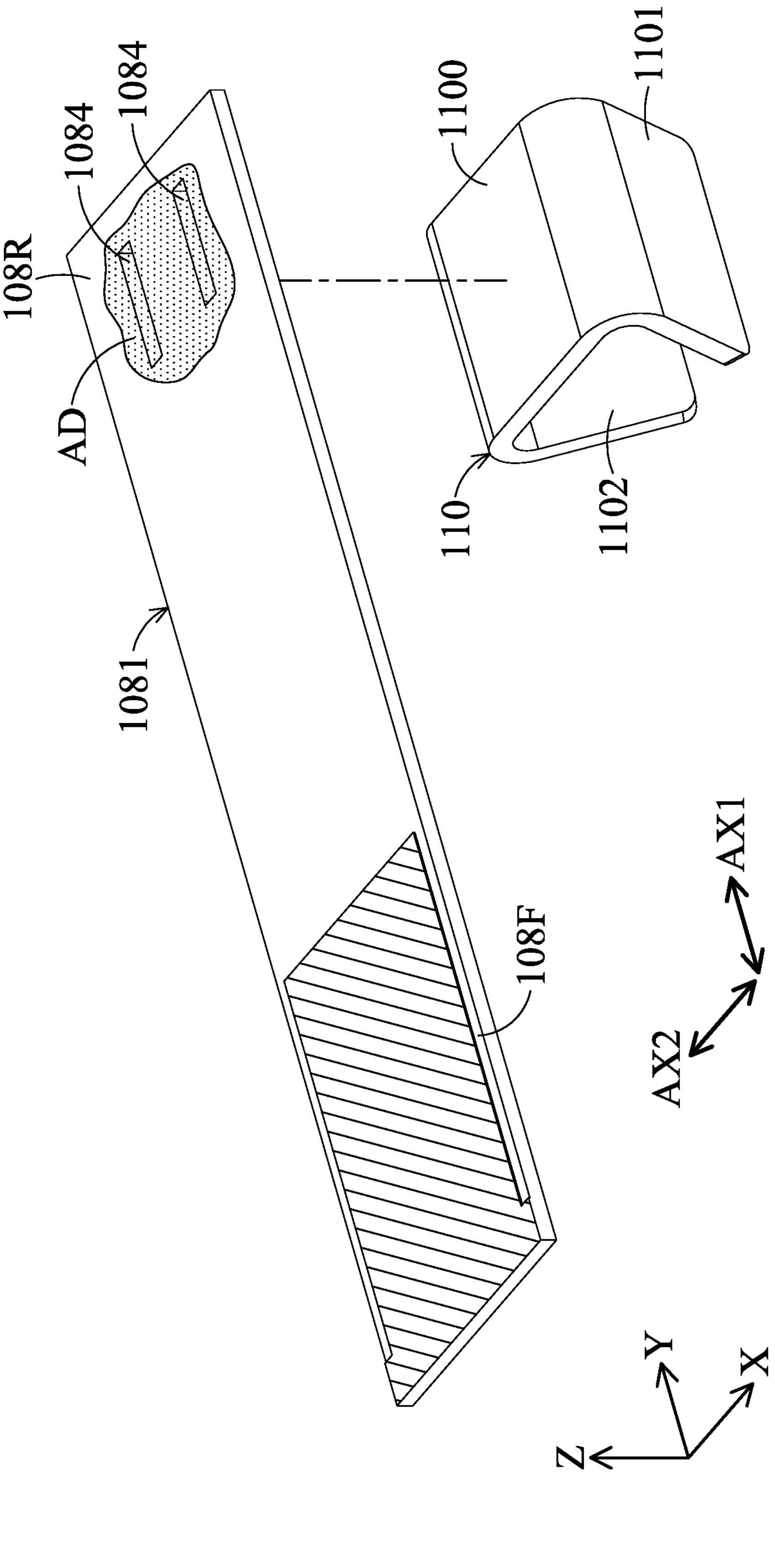
FIG. 6 is a perspective view of the movable part 1081 and the holding assembly 110 according to an embodiment of the present disclosure.

Please refer to FIG. 6, which is a perspective view of the movable part 1081 and the holding assembly 110 according to an embodiment of the present disclosure. In this embodiment, the movable part 1081 has a front side portion 108F and a rear side portion 108R, the rear side portion 108R is connected to the front side portion 108F, and the rear side portion 108R and the front side portion 108F are integrally formed as one piece.

The bottom plate 1100 of the holding assembly 110 is fixedly connected to the rear side portion 108R. Specifically, a plurality of first through holes 1084 may be formed on the rear side portion 108R. In this embodiment, two first through holes 1084 are formed on the rear side portion 108R. Each of first through holes 1084 extends along the first axis AX1, and these first through holes 1084 are arranged along the second axis AX2.

Moreover, the optical element driving mechanism 100 may further include an adhesive element AD configured to be accommodated in the first through holes 1084 and to contact the bottom plate 1100, so that the rear side portion 108R is adhered to the bottom plate 1100. The adhesive element AD is, for example, glue which can flow into these first through holes 1084 and contact the bottom plate 1100.

Figure 7:
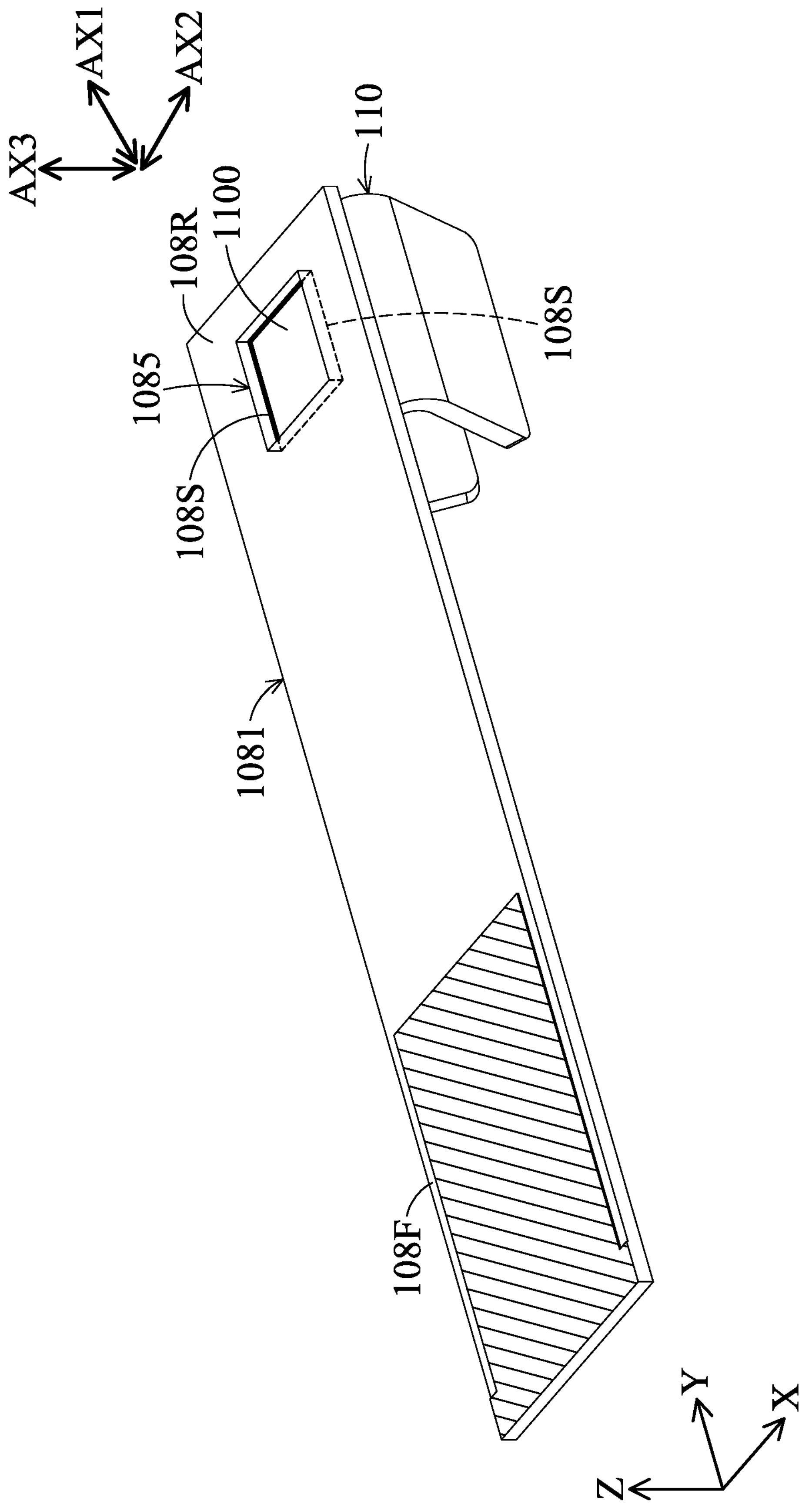
FIG. 7 is a perspective view of the movable part 1081 and the holding assembly 110 according to another embodiment of the present disclosure.

Next, please refer to FIG. 7, which is a perspective view of the movable part 1081 and the holding assembly 110 according to another embodiment of the present disclosure. In this embodiment, the movable part 1081 is made of metal, such as stainless steel. The holding assembly 110 is also made of metal, such as iron or copper, but it is not limited thereto.

Similar to the previous embodiment, the rear side portion 108R and the front side portion 108F of the movable part 1081 in this embodiment are integrally formed as one piece, and the bottom plate 1100 is fixedly connected to the rear side portion 108R.

Specifically, the rear side portion 108R has a hole 108S. When viewed along a third axis AX3, the hole 1085 has a rectangular structure. When viewed along the third axis AX3, the hole 1085 is formed by four inner edges 108S of the rectangular structure. The third axis AX3 is perpendicular to the first axis AX1 and the second axis AX2.

In this embodiment, the four inner edges 108S are affixed to the bottom plate 1100 by laser welding. Based on such a design, the connection strength between the movable part 1081 and the holding assembly 110 can be increased.

Figure 8:
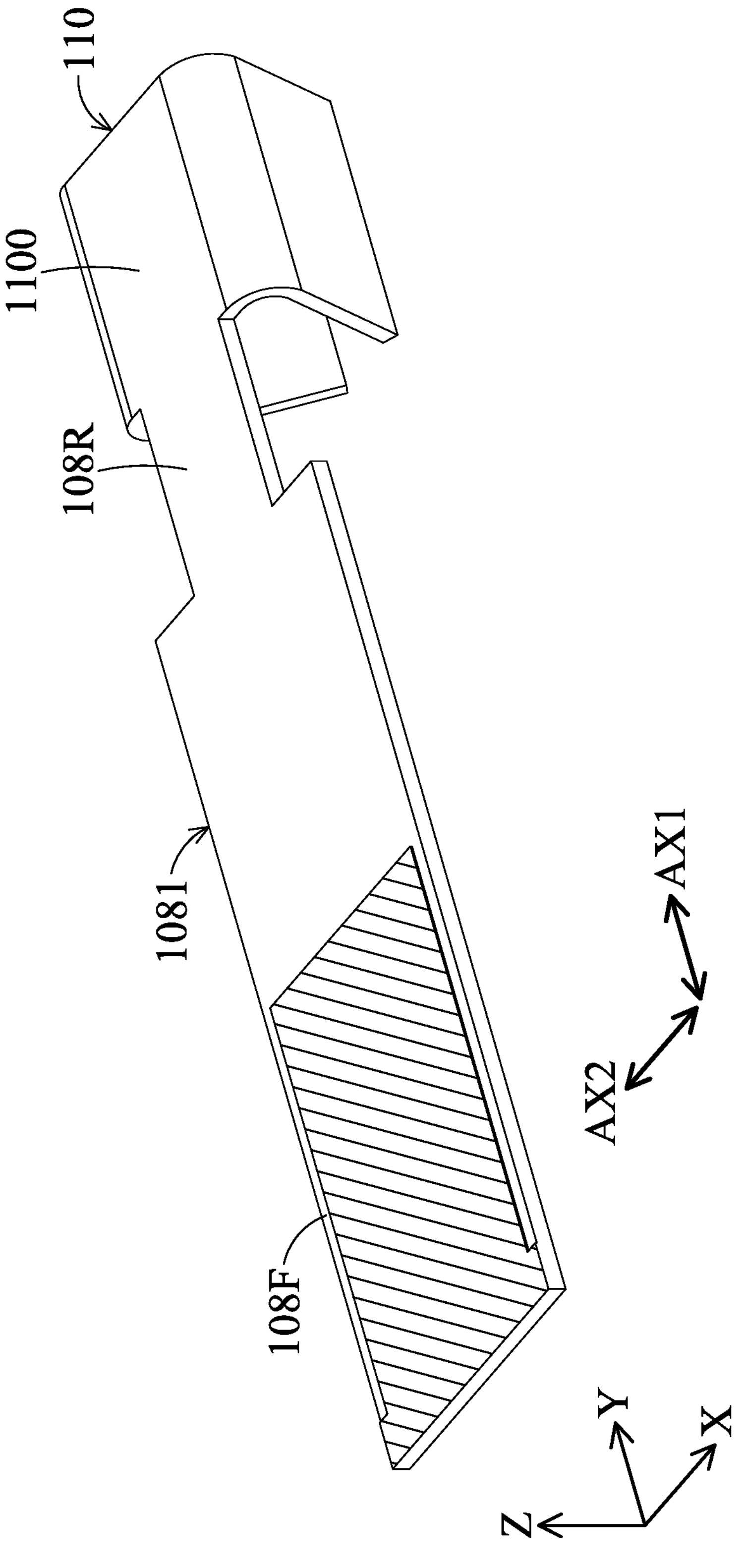
FIG. 8 is a perspective view of the movable part 1081 and the holding assembly 110 according to another embodiment of the present disclosure.

Next, please refer to FIG. 8, which is a perspective view of the movable part 1081 and the holding assembly 110 according to another embodiment of the present disclosure. Similar to the previous embodiments, the rear side portion 108R and the front side portion 108F are integrally formed as one piece, and the width of the rear side portion 108R along the second axis AX2 is smaller than the width of the front side portion 108F along the second axis AX2.

It should be noted that in this embodiment, the bottom plate 1100 of the holding assembly 110 and the rear side portion 108R are integrally formed as one piece. Based on such a design, not only the connection strength between the movable part 1081 and the holding assembly 110 can be increased, but also the overall height of the optical element driving mechanism 100 can be reduced, so as to achieve the purpose of miniaturization.

Figure 9:
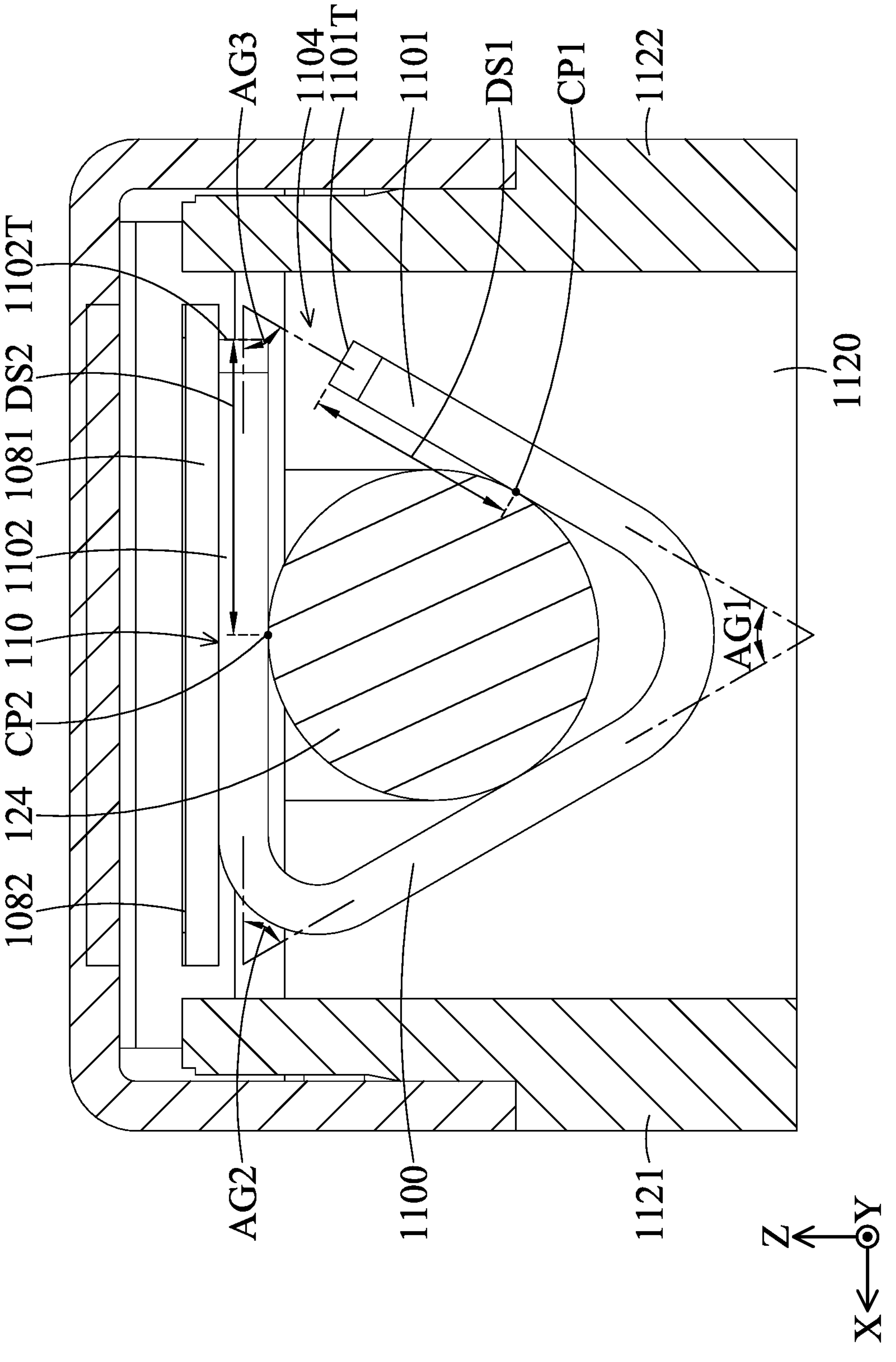
FIG. 9 is a cross-sectional view of the optical element driving mechanism 100 according to another embodiment of the present disclosure.

Next, please refer to FIG. 9, which is a cross-sectional view of the optical element driving mechanism 100 according to another embodiment of the present disclosure. In this embodiment, the holding opening 1104 is facing a side wall (the second side wall 1122) of the base 112 of the fixed assembly FA, and the movable part 1081 is fixedly connected to the second side plate 1102.

When viewed along the first axis AX1, the included angle AG1 between the first side plate 1101 and the bottom plate 1100 is between 30 degrees to 70 degrees. When viewed along the first axis AX1, the included angle AG2 between the second side plate 1102 and the bottom plate 1100 is between 30 degrees to 70 degrees. When viewed along the first axis AX1, the included angle AG3 between the first side plate 1101 and the second side plate 1102 is greater than 40 degrees and less than or equal to 120 degrees.

When viewed along the first axis AX1, the first side plate 1101 is in contact with the driving member 124 at the first contact point CP1. In this embodiment, the shortest distance DS1 between the first contact point CP1 and the first end portion 1101T of the first side plate 1101 is less than or equal to 0.6 mm.

When viewed along the first axis AX1, the second side plate 1102 is in contact with the driving member 124 at the second contact point CP2. The shortest distance DS2 between the second contact point CP2 and the second end portion 1102T of the second side plate 1102 is less than or equal to 1 mm.

When viewed along the first axis AX1, the length of the first side plate 1101 is different from the length of the second side plate 1102. In this embodiment, when viewed along the first axis AX1, the length of the first side plate 1101 is less than the length of the second side plate 1102.

Based on the design of the holding assembly 110 of this embodiment, when the optical element driving mechanism 100 is impacted, it can be ensured that the driving member 124 is not separated from the holding assembly 110, thereby increasing the overall reliability.

Figure 10:
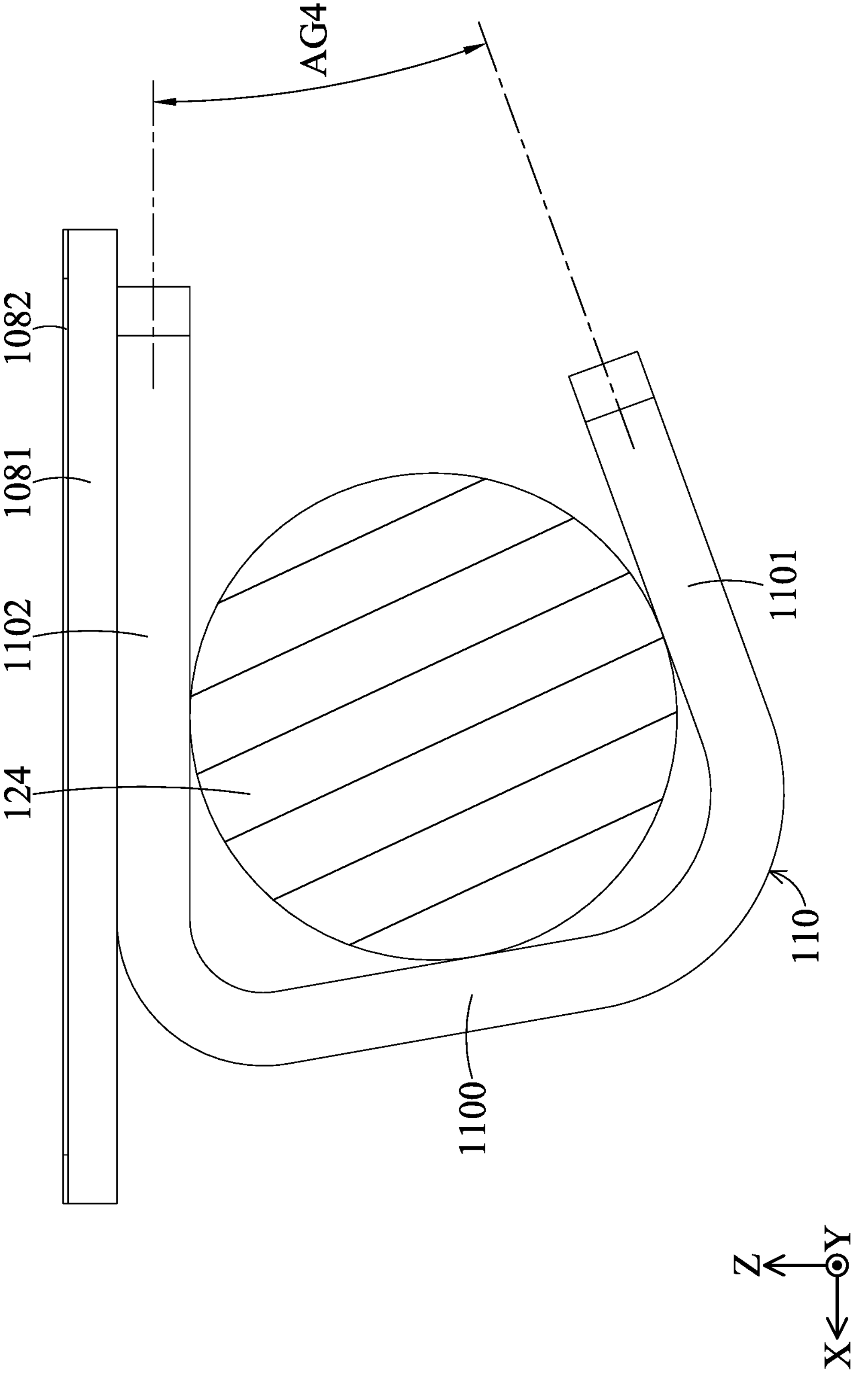
FIG. 10 is a rear view of the movable part 1081, the holding assembly 110 and the driving member 124 according to another embodiment of the present disclosure.

Please refer to FIG. 10, which is a rear view of the movable part 1081, the holding assembly 110 and the driving member 124 according to another embodiment of the present disclosure. In this embodiment, the included angle AG4 formed between the first side plate 1101 and the second side plate 1102 is greater than the included angle AG3 in the previous embodiments.

Based on such a structural design, the holding assembly 110 of this embodiment can hold the driving member 124 with a larger diameter to provide a greater driving force to drive the holding assembly 110 and the movable part 1081 to move quickly.

Figure 11:
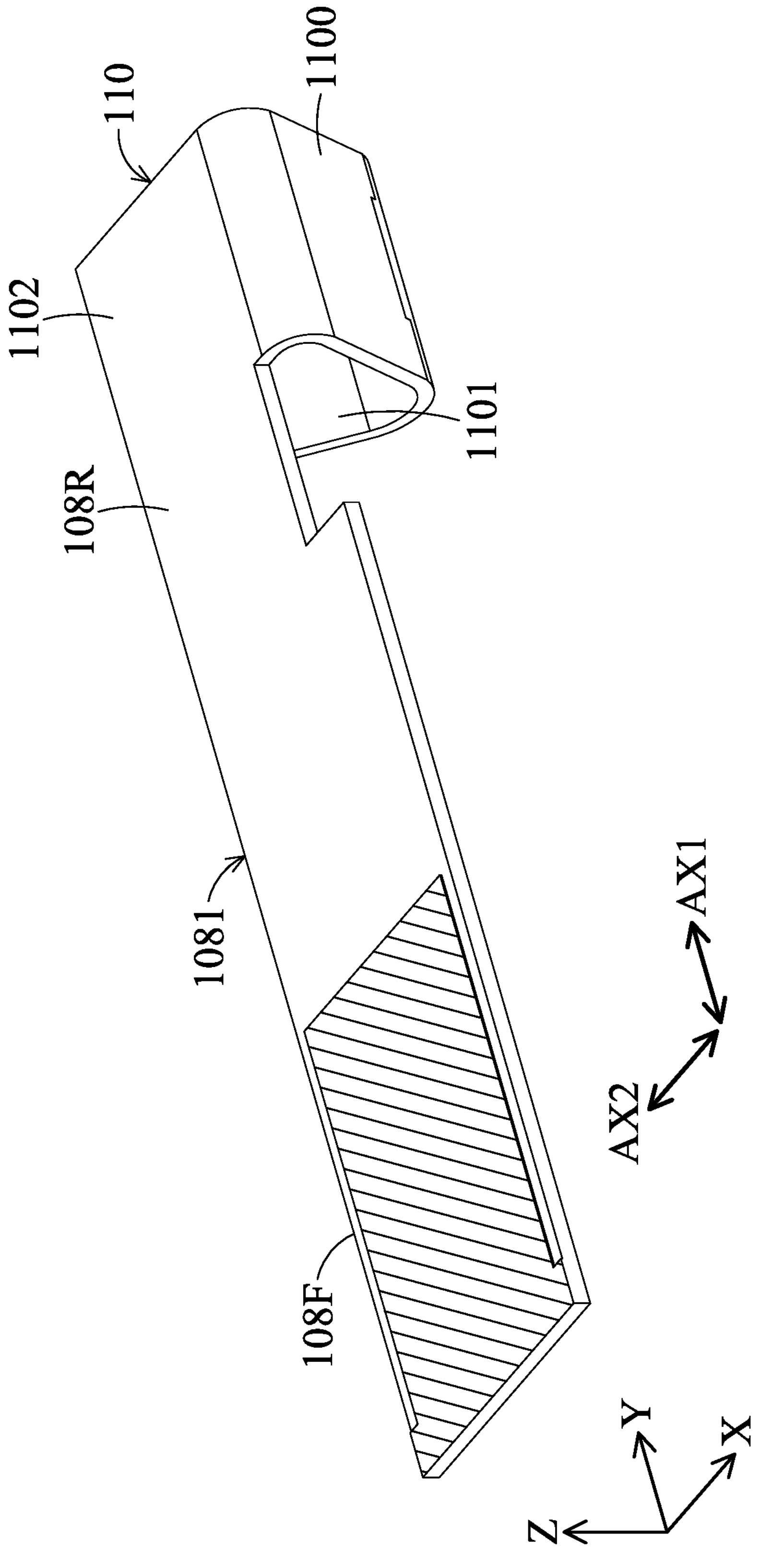
FIG. 11 is a perspective view of the movable part 1081 and the holding assembly 110 according to another embodiment of the present disclosure.

Please refer to FIG. 11, which is a perspective view of the movable part 1081 and the holding assembly 110 according to another embodiment of the present disclosure. Similar to the previous embodiments, the rear side portion 108R and the front side portion 108F are integrally formed as one piece, and the width of the rear side portion 108R along the second axis AX2 is less than the width of the front side portion 108F along the second axis AX2.

It should be noted that in this embodiment, the second side plate 1102 of the holding assembly 110 and the rear side portion 108R are integrally formed as one piece. Based on such a design, it can not only ensure that the driving member 124 is not separated from the holding assembly 110 when it is impacted, but also reduce the overall height of the optical element driving mechanism 100, so as to achieve the purpose of miniaturization.

In summary, This disclosure provides an optical element driving mechanism, including a fixed assembly, a movable part, a driving assembly and a holding assembly. The driving assembly drives the movable part to move relative to the fixed assembly between a first extreme position and a second extreme position by the holding assembly, so that the movable part selectively shields the first opening of the fixed assembly. Therefore, the optical element driving mechanism can be used as a shutter mechanism.

In addition, in some embodiments, the driving assembly DA has a driving member 124 with a long strip-shaped structure, and the holding assembly 110 includes a bottom plate 1100, a first side plate 1101 and a second side plate 1102. The first side plate 1101 is bent from the bottom plate 1100 and extends toward the second side plate 1102, the second side plate 1102 is bent from the bottom plate 1100 and extends toward the first side plate 1101, and the bottom plate 1100, the first side plate 1101 and the second side plate 1102 cooperatively hold the driving member 124.

Based on such a structural design, when the optical element driving mechanism 100 is impacted, it can be ensured that the driving member 124 is not separated from the holding assembly 110 when impacted, thereby increasing the overall reliability. In addition, the bottom plate 1100 and the movable part 1081 can be integrally formed as one piece, so that the overall height of the optical element driving mechanism 100 can be reduced, so as to achieve the purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:

a fixed assembly;

a movable part, wherein the movable part is movable relative to the fixed assembly; and a driving assembly, configured to drive the movable part to move relative to the fixed assembly;

wherein the optical element driving mechanism further comprises a holding assembly, and the driving assembly drives the movable part to move relative to the fixed assembly by the holding assembly;

wherein the driving assembly comprises a counterweight, a piezoelectric element and a driving member, the piezoelectric element is connected to the counterweight, and the driving member is connected to the piezoelectric element;

wherein the holding assembly is disposed on the driving member;

wherein the holding assembly has a plate-shaped structure;

wherein the holding assembly comprises a bottom plate, a first side plate and a second side plate;

wherein the bottom plate has a flat plate-shaped structure;

wherein the first side plate is bent from the bottom plate and extends from the bottom plate toward the second side plate;

wherein the second side plate is bent from the bottom plate and extends from the bottom plate toward the first side plate;

wherein the bottom plate, the first side plate and the second side plate are integrally formed as one piece;

wherein the driving member has a long strip-shaped structure, and extends along a first axis;

wherein when viewed along the first axis, the movable part does not overlap with the holding assembly;

wherein when viewed along a second axis, the movable part does not overlap with the holding assembly;

wherein when viewed along a third axis, the movable part partially overlaps with the holding assembly;

wherein the first axis, the second axis, and the third axis are perpendicular to each other;

wherein the first side plate and the second side plate are formed by bending opposite ends of the bottom plate toward each other, and wherein the bottom plate, the first side plate and the second side plate are formed from a single continuous sheet material.

2. The optical element driving mechanism as claimed in claim 1, wherein when viewed along the first axis, the driving member has a circular structure; and the bottom plate, the first side plate and the second side plate are respectively in contact with the driving member.

3. The optical element driving mechanism as claimed in claim 2, wherein a holding opening is formed between the first side plate and the second side plate;

the holding opening faces a base wall of a base of the fixed assembly;

when viewed along the first axis, an included angle between the first side plate and the bottom plate is between 30 degrees and 70 degrees; and when viewed along the first axis, an included angle between the first side plate and the second side plate is greater than 40 degrees and less than or equal to 120 degrees.

4. The optical element driving mechanism as claimed in claim 3, wherein when viewed along the first axis, the first side plate is in contact with the driving member at a first contact point;

a shortest distance between the first contact point and a first end portion of the first side plate is less than or equal to 0.4 mm;

when viewed along the first axis, the second side plate is in contact with the driving member at a second contact point; and a shortest distance between the second contact point and a second end portion of the second side plate is less than or equal to 0.4 mm.

5. The optical element driving mechanism as claimed in claim 4, wherein when viewed along the first axis, the first side plate is symmetrical to the second side plate; and when viewed along the first axis, the first side plate and/or the second side plate have an arc-shaped structure.

6. The optical element driving mechanism as claimed in claim 5, wherein the movable part has a front side portion and a rear side portion;

the rear side portion is connected to the front side portion;

the rear side portion and the front side portion are integrally formed as one piece; and the bottom plate is fixedly connected to the rear side portion.

7. The optical element driving mechanism as claimed in claim 6, wherein a plurality of first through holes is formed on the rear side portion;

each first through hole extends along the first axis;

the first through holes are arranged along the second axis; and the second axis is perpendicular to the first axis.

8. The optical element driving mechanism as claimed in claim 7, wherein the optical element driving mechanism further comprises an adhesive element configured to be accommodated in the first through holes and contact the bottom plate so that the rear side portion is adhered to the bottom plate.

9. The optical element driving mechanism as claimed in claim 5, wherein the movable part has a metal material;

the holding assembly has a metal material;

the movable part has a front side portion and a rear side portion;

the rear side portion is connected to the front side portion;

the rear side portion and the front side portion are integrally formed as one piece; and the bottom plate is fixedly connected to the rear side portion.

10. The optical element driving mechanism as claimed in claim 9, wherein the rear side portion has a hole;

when viewed along the third axis, the hole has a rectangular structure;

when viewed along the third axis, the hole is formed by four inner edges of the rectangular structure;

the four inner edges are affixed to the bottom plate by laser welding; and the third axis is perpendicular to the first axis.

11. The optical element driving mechanism as claimed in claim 5, wherein the movable part has a front side portion and a rear side portion;

the rear side portion is connected to the front side portion;

the rear side portion and the front side portion are integrally formed as one piece; and the bottom plate and the rear side portion are integrally formed as one piece.

12. The optical element driving mechanism as claimed in claim 2, wherein a holding opening is formed between the first side plate and the second side plate;

the holding opening faces a side wall of a base of the fixed assembly;

when viewed along the first axis, an included angle between the first side plate and the bottom plate is between 30 degrees and 70 degrees;

when viewed along the first axis, an included angle between the second side plate and the bottom plate is between 30 degrees and 70 degrees; and when viewed along the first axis, an included angle between the first side plate and the second side plate is greater than 40 degrees and less than or equal to 120 degrees.

13. The optical element driving mechanism as claimed in claim 12, wherein when viewed along the first axis, the first side plate is in contact with the driving member at a first contact point;

a shortest distance between the first contact point and a first end portion of the first side plate is less than or equal to 0.6 mm;

when viewed along the first axis, the second side plate is in contact with the driving member at a second contact point; and a shortest distance between the second contact point and a second end portion of the second side plate is less than or equal to 1 mm.

14. The optical element driving mechanism as claimed in claim 13, wherein when viewed along the first axis, a length of the first side plate is different from a length of the second side plate; and when viewed along the first axis, the length of the first side plate is less than the length of the second side plate.

15. The optical element driving mechanism as claimed in claim 14, wherein the movable part has a front side portion and a rear side portion;

the rear side portion is connected to the front side portion;

the rear side portion and the front side portion are integrally formed as one piece; and the second side plate and the rear side portion are integrally formed as one piece.

16. The optical element driving mechanism as claimed in claim 1, wherein the optical element driving mechanism further comprises a stopping assembly configured to limit the movable part to move relative to the fixed assembly within a range of motion;

the fixed assembly further comprises an outer frame and a base;

the outer frame is fixedly connected to the base;

the outer frame has a first opening;

when the movable part is located in a first extreme position of the range of motion, the movable part does not overlap the first opening; and when the driving assembly drives the movable part to move from the first extreme position along the first axis to a second extreme position of the range of motion, the movable part overlaps the first opening.

17. The optical element driving mechanism as claimed in claim 16, wherein the stopping assembly comprises a first stopping portion and a second stopping portion, respectively disposed on a first side wall and a second side wall of the base;

the stopping assembly further comprises a first stopping structure and a second stopping structure, disposed on the movable part; and the first stopping portion and the second stopping portion are configured to respectively block the first stopping structure and the second stopping structure.

18. The optical element driving mechanism as claimed in claim 17, wherein a first gap between the first stopping portion and the first stopping structure along the second axis is less than or equal to 0.1 mm;

a second gap between the second stopping portion and the second stopping structure along the second axis is less than or equal to 0.1 mm; and the second axis is perpendicular to the first axis.

19. The optical element driving mechanism as claimed in claim 18, wherein the stopping assembly further comprises a third stopping portion and a fourth stopping portion, which are disposed on a base wall of the base;

when the movable part is located in the first extreme position, the third stopping portion is configured to block the holding assembly; and when the movable part is located in the second extreme position, the fourth stopping portion is configured to block the holding assembly.

20. An optical element driving mechanism, comprising:

a fixed assembly;

a movable part, wherein the movable part is movable relative to the fixed assembly; and a driving assembly, configured to drive the movable part to move relative to the fixed assembly, wherein the optical element driving mechanism further comprises a holding assembly, and the driving assembly drives the movable part to move relative to the fixed assembly by the holding assembly, wherein the driving assembly comprises a counterweight, a piezoelectric element and a driving member, the piezoelectric element is connected to the counterweight, and the driving member is connected to the piezoelectric element, wherein the holding assembly is disposed on the driving member, wherein the holding assembly has a plate-shaped structure, wherein the holding assembly comprises a bottom plate, a first side plate and a second side plate, wherein the bottom plate has a flat plate-shaped structure, wherein the first side plate is bent from the bottom plate and extends from the bottom plate toward the second side plate, wherein the second side plate is bent from the bottom plate and extends from the bottom plate toward the first side plate, wherein the bottom plate, the first side plate and the second side plate are integrally formed as one piece, wherein the first side plate and the second side plate are formed by bending opposite ends of the bottom plate toward each other, and wherein the bottom plate, the first side plate and the second side plate are formed from a single continuous sheet material.

* * * * *